B. E. ANGLUND.
CREAM COOLER.
APPLICATION FILED APR. 24, 1913.
1,077,383.
Patented Nov. 4, 1913.
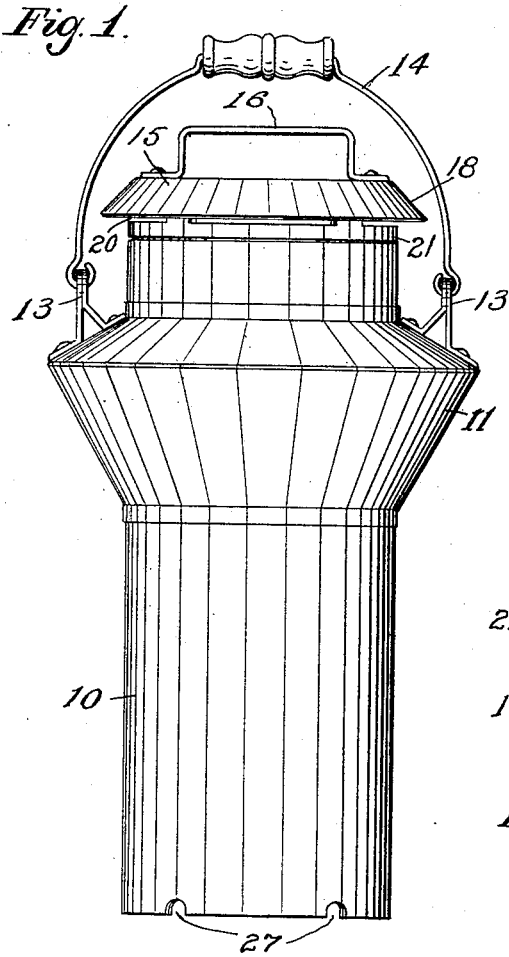
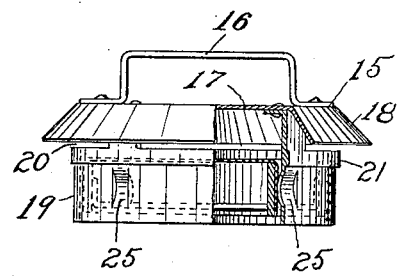
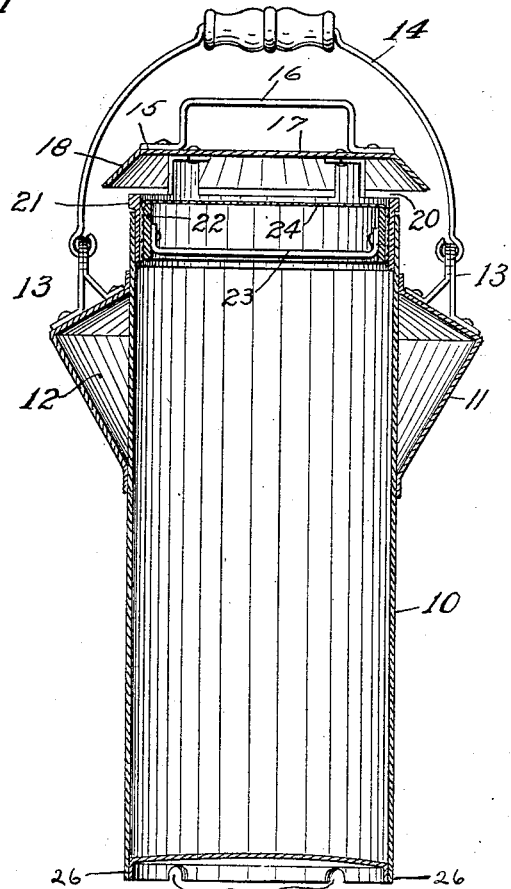
Witnesses
H. A. Bowman
C. F. Kilgore
Inventor
Bror E. Anglund
By R. U. Whiteley
His Attorney

UNITED STATES PATENT OFFICE.

BROR E. ANGLUND, OF ATWATER, MINNESOTA.

CREAM-COOLER.

1,077,383.    Specification of Letters Patent.    Patented Nov. 4, 1913.

Application filed April 24, 1913. Serial No. 763,296.

*To all whom it may concern:*

Be it known that I, BROR E. ANGLUND, a citizen of the United States, residing at Atwater, in the county of Kandiyohi and State of Minnesota, have invented certain new and useful Improvements in Cream-Coolers, of which the following is a specification.

My invention relates to an improvement in cream coolers and has for its object to provide a device of this character which shall be simple and inexpensive in construction and efficient and sanitary as a cooling device.

My device comprises a can with a casing containing an air chamber secured to the can near its top. The casing acts as a float and is of such size and so positioned that when the can is filled with cream and placed in water it will be held upright with the top of the can only exposed.

The cover for the can is of peculiar construction and is provided with wide ventilating slots which permit the air to circulate freely through the can. The cover is also provided with a filter which allows the circulating air to pass into and out of the can but prevents the entrance of dirt, dust, etc.

The full objects and advantages of my invention will appear in connection with the detailed description thereof and are particularly pointed out in the claims.

In the drawings, illustrating the application of my invention in one form,—Figure 1 is a side elevation of my invention. Fig. 2 is a sectional side elevation. Fig. 3 is a side elevation of the cover with its front walls partly broken away to show its construction in detail.

The cream cooler of my invention comprises an elongated can 10 of relatively small cross sectional area. To the can 10 near its top is secured a float or casing 11. The casing 11 is provided with an air chamber 12 of such size and so positioned that when the can is filled with cream and placed in water the casing holds the can upright with the top only exposed. Attached to the top of casing 11 are brackets 13 for the purpose of securing handle 14 to the can. A cover 15 is provided having a handle 16 fastened to its top plate 17. Around the outer edge of top piece 17 is a downwardly inclined flange 18. Attached to the bottom of top plate 17 is a collar 19 adapted to fit into the top of can 10. Collar 19 is provided with wide slots 20 cut into its periphery adjacent the top piece 17, and with an annular projection 21 formed beneath the slots 20 to prevent the cover 15 from being pushed down over the said slots. Removably positioned within the collar 19 is a ring 22 provided with a handle 23. Stretching across the top of ring 22 and engaging between the said ring 22 and the collar 19 is a filter 24 made of cloth or other suitable material for the purpose of permitting the free circulation of the air while preventing the entrance of dirt. Ring 22 is held firmly positioned in collar 19 by means of springs 25 formed in the wall of collar 19, each of said springs 25 being formed by cutting two longitudinal slots in the collar 19 a short distance apart and forcing the material between the slots toward the center of the collar. At the bottom of can 10 is a flange 26 provided with notches 27 cut therein to permit the escape of the air when can 10 is lowered into the water.

In operation the cream cooler of my invention would be filled with cream nearly to its top, a clean filter would be spread over the ring 22 and inserted into the collar 19 and the cover 15 would be placed on can 10. The said can 10 would then be lowered into the water, slots 27 permitting the escape of the air from the bottom flange 26 of the can. Owing to its weight the can 10 would sink into the water until it reached a point where it would be held upright in the water with the top only exposed by the float or air chamber 12. This construction permits very rapid cooling of the cream, and the constant circulation of pure air within the can serves to keep it sweet for a much longer time than might be otherwise possible.

This cream cooler solves one of the problems that confronts the cream industry of today. It provides a simple and inexpensive method of keeping cream sweet and cool for a long period of time.

It should be understood that my invention is not limited to the cooling of cream alone, but may be used also for milk or any other fluid where efficient, economical and sanitary cooling is desired.

I claim:—

1. A cream cooler having a detachable cover comprising a top piece with a downwardly sloping outer edge, a collar adapted to register with the opening in the can and having wide slots in its periphery adjacent its points of attachment to the top piece, a flange below the slots to register with the top wall of the can, and means removably attached within the collar to permit the circulation of air in the receptacle while preventing the entrance of dirt.

2. A cream cooler comprising a top piece, a collar attached to the bottom of said top piece and having wide slots in its periphery adjacent said top piece, a ring removably positioned within said collar, a handle on said ring, and a filter inserted over the ring and held positioned by binding contact with the outer wall of the ring and the inner wall of the collar to permit the free circulation of air while preventing the entrance of dirt.

In testimony whereof I affix my signature in presence of two witnesses.

BROR E. ANGLUND.

Witnesses:
H. A. BOWMAN,
ROBERT W. MUIR.

---

Copies of this patent may be obtained for five cents each, by addressing the "Commissioner of Patents, Washington, D. C."